(12) United States Patent
Atkins et al.

(10) Patent No.: US 8,789,954 B1
(45) Date of Patent: Jul. 29, 2014

(54) FRONT PROJECTION DISPLAY SYSTEM FOR A VEHICLE

(75) Inventors: Steven C. Atkins, Yorba Linda, CA (US); Chris A. Jameson, Fullerton, CA (US); Timothy J. Bohr, Fountain Valley, CA (US); James R. Dan, Yorba Linda, CA (US); David F. Little, Claremont, CA (US); Alfred S. Alvarado, Pomona, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 225 days.

(21) Appl. No.: 12/796,793

(22) Filed: Jun. 9, 2010

(51) Int. Cl.
*G03B 21/14* (2006.01)
*G03B 21/22* (2006.01)
*G03B 21/00* (2006.01)
*H04N 3/23* (2006.01)

(52) U.S. Cl.
USPC ............... 353/119; 353/13; 353/39; 348/746

(58) Field of Classification Search
USPC ........... 353/122, 39, 119, 101, 69, 70, 79, 13; 348/771, 745, 746
See application file for complete search history.

(56) References Cited

U.S. PATENT DOCUMENTS

| | | | |
|---|---|---|---|
| 4,038,523 A | 7/1977 | Widmer | |
| 5,096,271 A | 3/1992 | Portman | |
| 5,467,106 A | 11/1995 | Salomon | |
| 5,811,791 A | 9/1998 | Portman | |
| 6,023,289 A * | 2/2000 | Oravecz et al. | 348/77 |
| 6,424,386 B1 | 7/2002 | Shimizu | |
| 6,445,573 B1 | 9/2002 | Portman | |
| 6,604,829 B2 * | 8/2003 | Rodriguez, Jr. | 353/79 |
| 6,637,896 B2 * | 10/2003 | Li et al. | 353/119 |
| 6,997,301 B1 | 2/2006 | Seeley | |
| 7,148,935 B1 | 12/2006 | Ho | |
| 7,703,718 B2 * | 4/2010 | Saint-Jalmes et al. | 244/118.6 |
| 2005/0046755 A1 | 3/2005 | Hattori et al. | |
| 2005/0168710 A1 * | 8/2005 | Miyazawa et al. | 353/98 |
| 2006/0204125 A1 * | 9/2006 | Kempf et al. | 382/274 |
| 2007/0058141 A1 * | 3/2007 | Ozaki et al. | 353/98 |
| 2008/0179507 A2 | 7/2008 | Han | |
| 2008/0297726 A1 * | 12/2008 | Rodriguez et al. | 353/13 |
| 2009/0268164 A1 * | 10/2009 | Bowden et al. | 353/13 |
| 2010/0188588 A1 | 7/2010 | Sato et al. | |
| 2011/0279741 A1 * | 11/2011 | Smallhorn | 348/837 |

OTHER PUBLICATIONS

LG DLP Projector; HS101 Owner's Manual; Sep. 5, 2007; LG Electronics Inc.*
"Handheld Projector"; http://en.wikipedia.org/wiki/Handheld_projector; printed on May 17, 2010.

(Continued)

*Primary Examiner* — William C Dowling
*Assistant Examiner* — Ryan Howard
(74) *Attorney, Agent, or Firm* — Donna P. Suchy; Daniel M. Barbieri (57) ABSTRACT

A front projection display system for a vehicle including a pico projector including keystone correction; and, a retractable pico front projector screen operatively connected to the pico projector. In one embodiment, a common housing contains the pico projector and the retractable pico front projector screen. In another embodiment the pico projector is mounted within the protective covering. In some embodiments the front projector screen is motor driven and in other embodiments it operated by hand. The present invention is particularly advantageous in an aircraft environment where size and weight considerations are imperative.

12 Claims, 10 Drawing Sheets

(56) References Cited

OTHER PUBLICATIONS

"Projector Keystone Projector"; http://www.projectorpeople.com/resources/keystone-correction.asp; printed on Jun. 6, 2010.

Optoma PK301 Pico Pocket Projector review by PC magazine published on Apr. 26, 2010.

Optoma PK102 Pico Pocket Projector Specification published in 2009.

* cited by examiner

FRONT PROJECTION DISPLAY SYSTEM FOR A VEHICLE

BACKGROUND OF THE INVENTION

1. Field of the Invention

This invention relates to entertainment systems and more specifically to display systems integrated into entertainment systems utilized on transportation vehicles.

2. Description of the Related Art

Today's world involves numerous situations in which one is required to endure trips of varying distance and time for both pleasure and work reasons. To accomplish these travels a wide assortment of personal and commercial vehicles including automobiles, buses, ships, trains and aircraft are relied upon on a daily basis. For those individuals not operating the respective vehicle, the duration of the trip provides a captive situation which is often addressed by access to wireless broadcast information, such as television, or viewing pre-recorded information stored on the vehicle for playback during the trip. Such systems are often referred to as on-board entertainment system or mobile entertainment systems. With advances in electronics in recent years, with respect to size, cost and ruggedness, such on-board entertainment systems are commonly found in numerous vehicles.

There are numerous patents that have issued that have involved advances in display systems for on-board entertainment systems. These include, for example, the following patents:

U.S. Pat. No. 5,467,106 entitled "Retractable Face-Up LCD Monitor with Off-Monitor Power Supply and Back-EMF Braking", issued to A. H. Salomon, discloses a retractable LCD monitor for use in aircraft and the like that is supplied with power from a power supply that is secured in a fixed off-monitor location on the monitor's housing. The power supply also provides power for a motor assembly that controls a pivoting of the monitor between open and retracted positions. This configuration allows for a compact monitor assembly that can be stowed screen up within a restricted space housing, thus protecting the display from damage by passengers and presenting a pleasing appearance, while still pivoting the monitor by more than 90° to its open position. The motor that is used to pivot the monitor to the open position remains coupled to the monitor pivot mechanism during the retraction cycle, providing a back-emf that resists a spring force used to retract the monitor, and thereby cushion its retraction.

U.S. Pat. No. 6,445,573 entitled "Spring Cam Mechanism for Stowing a Monitor", issued to J. Portman, et al., discloses an apparatus which includes a frame, a video monitor display mounted to the frame, a torque shaft coupled to the frame such that rotation of the torque shaft causes the frame to pivot along a predetermined arc. The apparatus further involves engaging to the torque shaft to impart rotational motion to the torque shaft, a releasable cam follower slidably disposed on the cam shaft and a spring mounted on the cam shaft exerting a spring bias force directed toward the cam so as to cause rotational motion of the cam.

U.S. Pat. No. 5,811,791 entitled "Method and Apparatus for Providing a Vehicle Entertainment Control System Having an Override Control Switch", issued to J. Portman, discloses a method and apparatus for providing a vehicle entertainment control system that controls a plurality of display units. The vehicle entertainment control system includes a remote override control circuit capable of activating a remote signal for moving at least one of the plurality of display units between a first position and a second position. In addition, the vehicle entertainment control system includes a local display unit movement control circuit coupled to one of the plurality of display units. The local display unit movement control circuit includes a photodiode coupled to said local display unit movement control circuit, the photodiode transmits a light beam capable of being reflected from a reflective surface near the photodiode to make a reflected light beam, and a photodetector coupled to the local display unit movement control circuit, the photodetector providing a signal to the local display unit control circuit upon detection of said reflected light beam to move one of the display units between the first position and the second position.

U.S. Pat. No. 7,148,935 entitled "On-Board Entertainment System Entertainment Display Retractor Position Sensor", issued to C. Ho, et al., discloses a position sensor for determining the relative physical location of a movable item via a combination of a sensor and an indicator plate affixed to an actuator device.

U.S. Pat. No. 6,424,386 entitled "Liquid Crystal Display Device", issued to T. Shimizu, discloses a liquid crystal display device comprising a housing mounted to a ceiling member of an airplane. An image control unit is fixed to the housing, and a liquid crystal display is fixed to a main shaft positioned at a center of rotation. In a retracting unit, a liquid crystal panel of the liquid crystal display is opposed to the image control unit, and stored inside a cover surrounding the housing. The whole height of the liquid crystal display device may be reduced, so as to secure the overhead clearance of the passengers.

In vehicles and particularly in aircraft minimizing size, weight, and power consumption of all systems on board is a significant discriminator when selecting equipment. On large aircraft, the on-board display systems are the largest power consuming systems and this translates into additional fuel to drive electrical power generation. On very small aircraft, there is likely to be no display system, due to the overall availability of power. The weight of equipment is a discriminator because additional ounces of equipment reduce the range between refueling and translates to additional fuel expenditures. Due to the limited space on vehicles, minimizing the equipment size allows for more passenger space in the cabin.

The technology of a Pico projector (also known as a handheld projector, pocket projector or mobile projector) is an emerging technology that applies the use of a handheld device. It is a response to the emergence of compact portable devices such as mobile phones, personal digital assistants, and digital cameras which have sufficient storage capacity to handle presentation materials but little space to accommodate an attached display screen. Handheld projectors involve miniaturized hardware and software that can project digital images onto any nearby viewing surface, such as a wall. The system comprises four main parts: the electronics, the light sources (e.g. LED or laser), the combiner optic, and the scanning mirrors. First, the electronics system turns the image into an electronic signal. Next the electronic signals drive light sources with different colors and intensities down different paths. In the combiner optic the different light paths are combined into one path demonstrating a palette of colors. Finally, the mirrors copy the image pixel by pixel and can then project the image. This entire system is compacted into one very tiny chip. An important design characteristic of a handheld projector is the ability to project a clear image, regardless of the physical characteristics of the viewing surface. (http://en.wikipedia.org/wiki/Handheld_projector[5/17/2010])

In front projector systems "keystoning" is problematic. "Keystoning" occurs when a projector is aligned non-perpendicularly to a screen, or when the projection screen has an angled surface. The image that results from one of these misalignments will look trapezoidal rather than square. There are basically two methods of keystone correction, manual and digital. Manual keystone correction is essentially a physical adjustment to the lens of the projector so that it projects at an angle higher or lower than it would be if it were on a flat surface. Digital correction involves altering the image before it reaches the projection lens. (http://www.projectorpeople.com/resources/keystone-correction.asp [6/6/2010])

Although pico projectors have been utilized in a variety of applications those applications have not included aircraft on-board entertainment systems.

SUMMARY OF THE INVENTION

In one broad aspect, the present invention is a front projection display system for a vehicle including a pico projector including keystone correction; and, a retractable pico front projector screen operatively connected to the pico projector.

As defined herein the term "pico projector", refers to a projector having the following characteristics: a weight in a range of between about 8 oz and 16 oz; a volume in a range of between about 2.9 cubic inches and 63 cubic inches; power consumption in a range of between about 5 watts and 20 watts. The pico projector may have a brightness in a range of between about 10 and 100 lumens. Although the pico projector and front projector screen are constructed and arranged relative to each other so as to provide a proper viewable image and in this sense are "operably connected" use of this term is not meant to imply that the pico projector necessarily controls the screen deployment.

In one embodiment, the pico projector includes a pico projector light engine including an optics assembly having keystone correction optics for providing the keystone correction. The keystone correction optics includes a lens shifting system that optically compensates projector screen positioning offset from a position perpendicular to the light being emitted from the pico projector.

In another embodiment, the keystone correction includes digital keystone correction. The pico projector includes means for providing the digital keystone correction for pre-distorting the image to be projected when said projector screen is utilized that is not perpendicular to the light being emitted from the pico projector.

In one embodiment, a common housing contains the pico projector and the retractable pico front projector screen. In another embodiment the pico projector is mounted within the protective covering. In some embodiments the front projector screen is motor driven and in other embodiments it is operated by hand.

In another broad aspect, the projector screen is positioned so that the pico projector projects an image substantially perpendicular to the plane of the front projector screen, thus obviating a need for keystone correction.

The present invention is particularly advantageous in an aircraft environment where size, weight, and power consumption considerations are imperative.

DETAILED DESCRIPTION OF THE INVENTION

Figure 1:
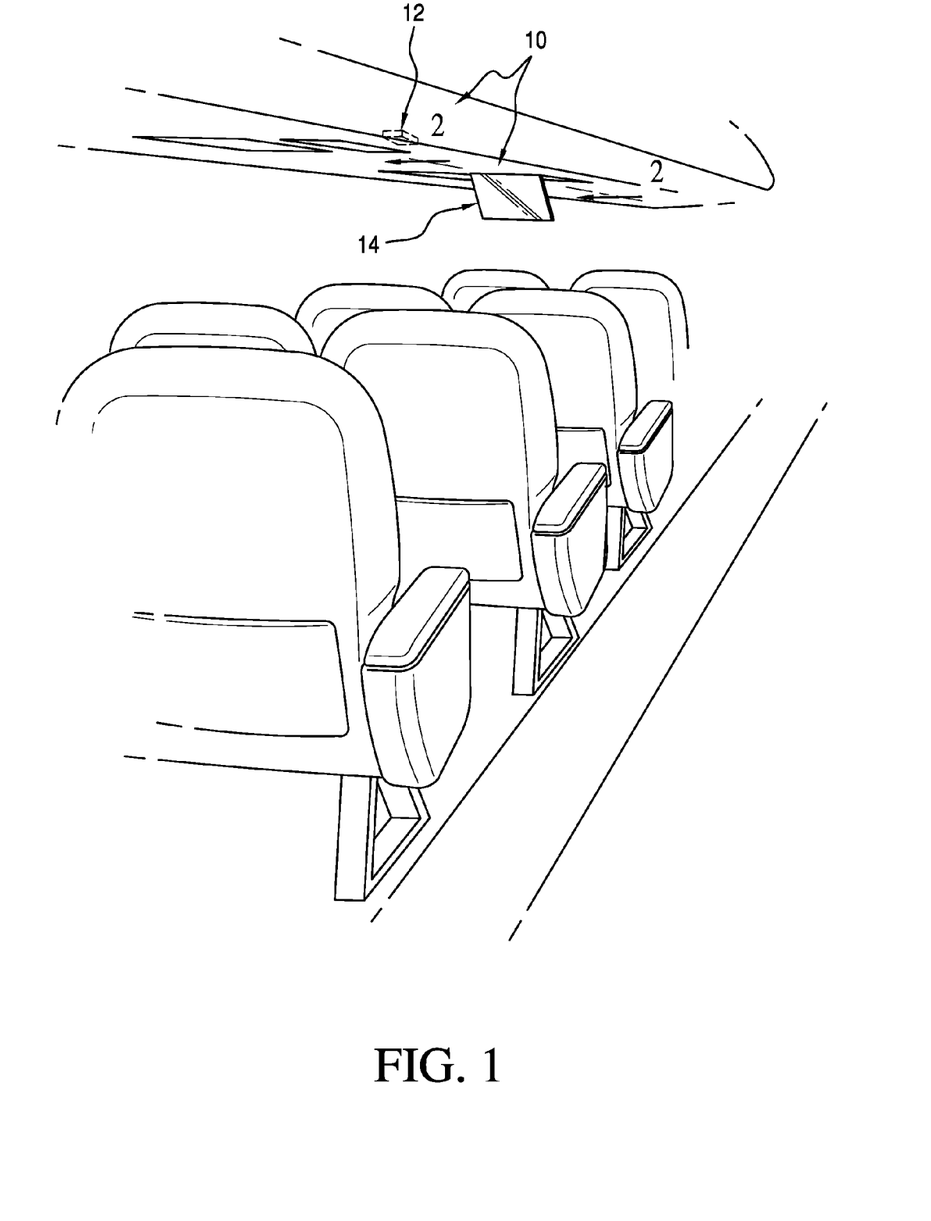
FIG. 1 is a perspective view of the front projection display system mounted in an aircraft cabin.

Referring now to the drawings and the characters of reference marked thereon, FIG. 1 illustrates a first embodiment of the front projection display system, designated generally as 10, mounted within an aircraft cabin. The front projection display system 10 includes a pico projector including keystone correction, designated generally as 12; and, a retractable front projector screen 14 operatively connected to the pico projector 12.

The Keystone effect, also known as the Tombstone effect, is caused by a projector displaying an image that is not perpendicular to the projection screen. The visual effect of keystoning is where parallel lines in the original image no longer appear parallel on the screen. As will be discussed below in detail, the pico projector 12 provides a mechanism for keystone correction.

Figure 2:
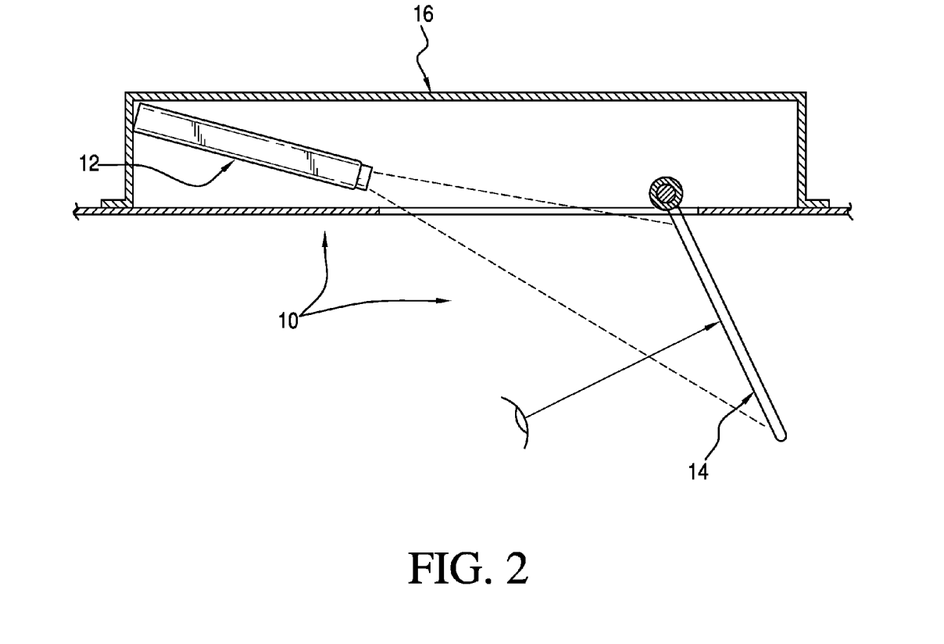
FIG. 2 is a view taken along line 2-2 of FIG. 1.
Figure 3:
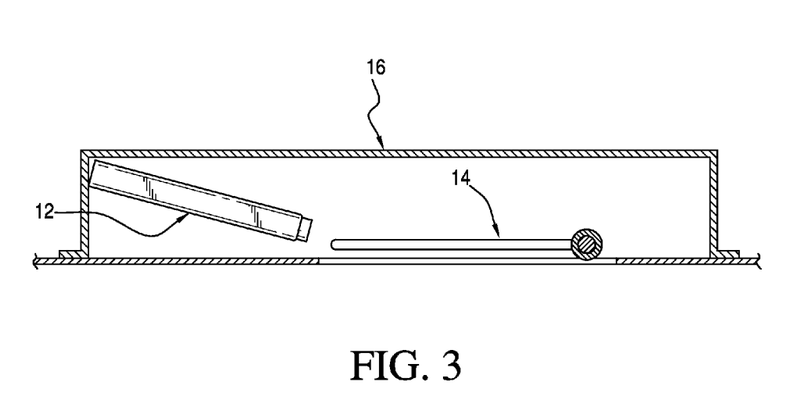
FIG. 3 is the same view as FIG. 2, but with the screen retracted.

Referring now to FIG. 2, in a first embodiment of the present invention the pico projector 12 and the retractable pico front projector screen 14 are contained within a common housing 16. As can be seen in FIG. 3, the front projector screen 14 is mounted so that it comprises a portion of the surface of a cabinet 16 of the aircraft cabin, when in the retracted position.

As mentioned above, although the pico projector has a volume in a range of between about 2.9 cubic inches and 63 cubic inches, this translates generally to the following dimensions: 1.8×2.7×0.6 inches to 5.6×5×2.25 inches. The typical volume is about 25 cubic inches for aircraft applications.

The pico projector 12 will be discussed below in detail.

The front projector screen 14 is typically formed of a vinyl fabric. Vinyl fabric offers a high degree of reflectivity and brilliance without loss of image quality or resolution. It is desired for a screen material that produces excellent video images with a low lumen projector and that operates well where there is a high amount of ambient light present. Screen surfaces are required to be flame retardant and mildew resistant. Screen materials may also be made from reflective materials (i.e. plastic, cloth, paper products, etc.). Screen materials typically have a viewing angle of about 30 to 60 degrees, with some as high as 85 degrees and a typical gain of about 0.8 to 2.8.

Figure 4:
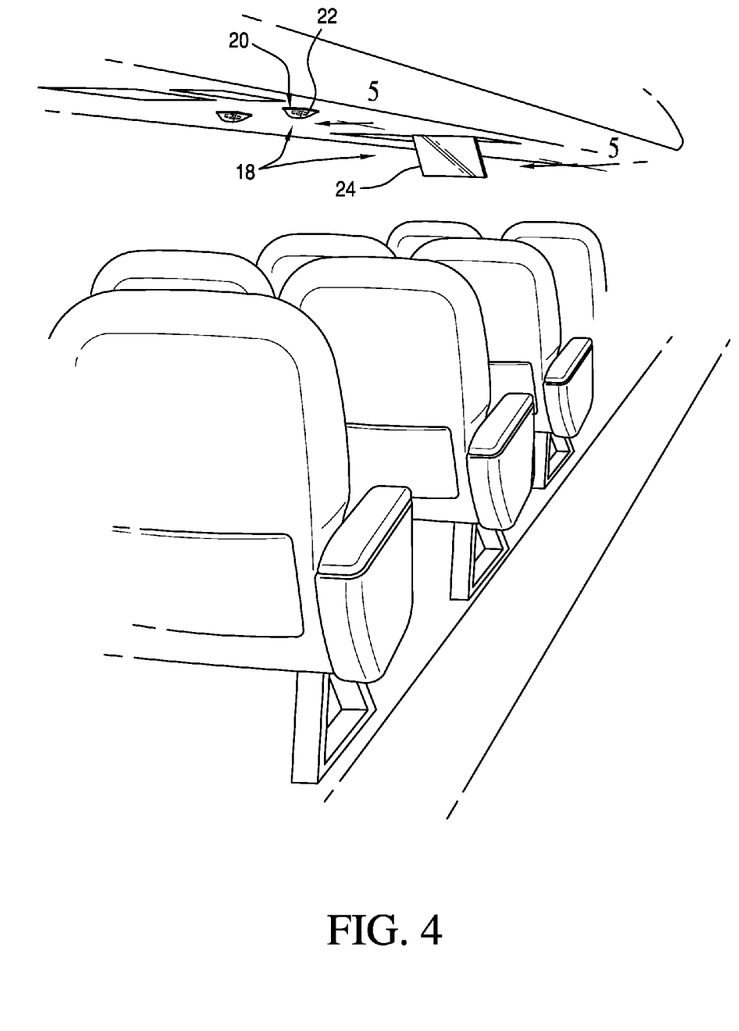
FIG. 4 is a perspective view of a second embodiment of the present invention in which the pico projector is mounted within a protective covering.
Figure 5:
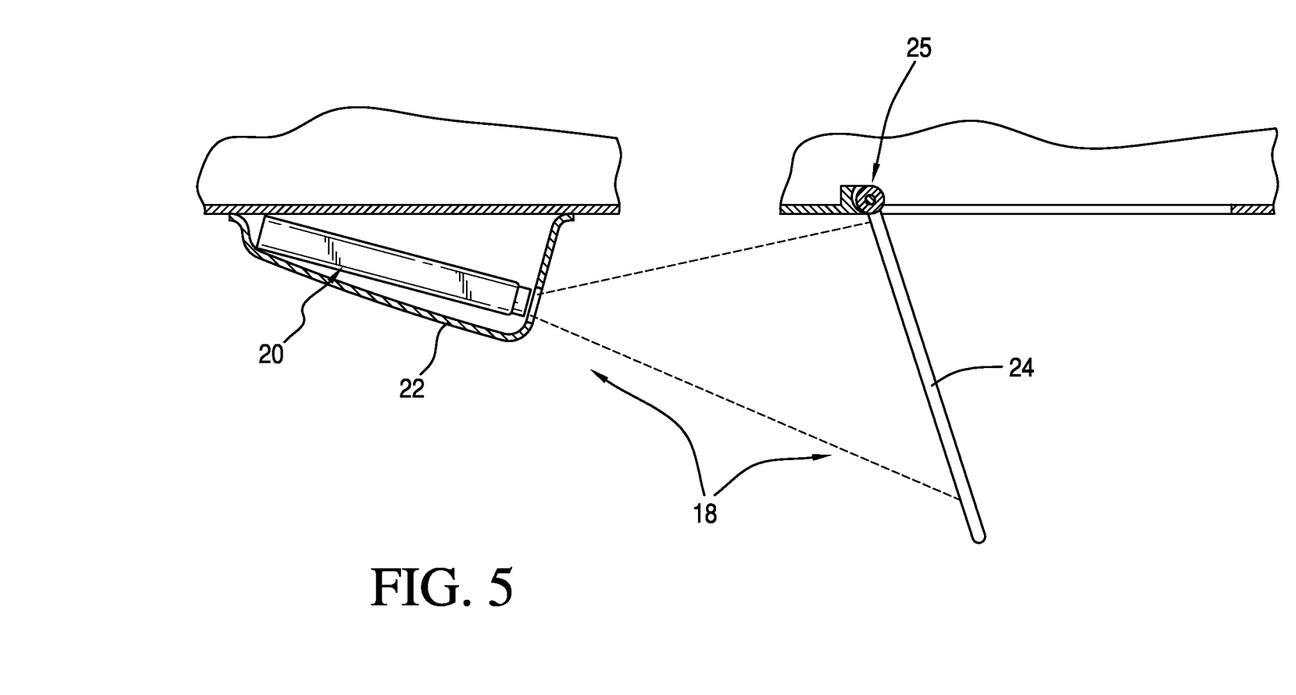
FIG. 5 is a section view taken along line 5-5 of FIG. 4.

Referring now to FIGS. 4 and 5, another embodiment of the present invention is illustrated, designated generally as 18. In this embodiment, the pico projector 20 is mounted within a protective covering, i.e. dimple 22. The protective covering 22 is typically designed to protect and to hide the projector 20. The protective covering is typically made of the same materials as the surrounding mounting surfaces. This is to have the protective covering blend into the environment. The protective covering is typically is smooth and does not have any sharp corners or edges. Typically, the size of the protective cover is no larger than is required to hide and protect the projector 20. The pico projector 20 may be housed in a housing the same as the screen 24, as shown. Alternatively, the projector housing and screen housing may be separate components. The pico projector 20 and screen 24 are operatively connected via a spring loaded retraction assembly 25.

Figure 6:
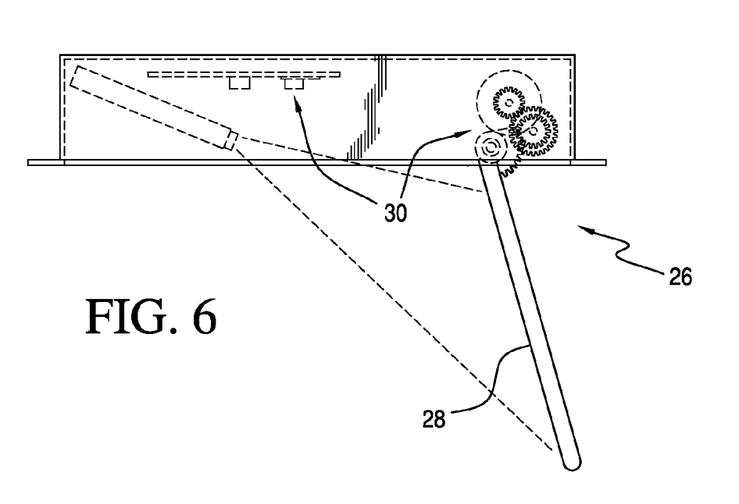
FIG. 6 is a side elevation of a third embodiment in which the pico projector and the front projector screen are operatively connected via a motor assembly.
Figure 7:
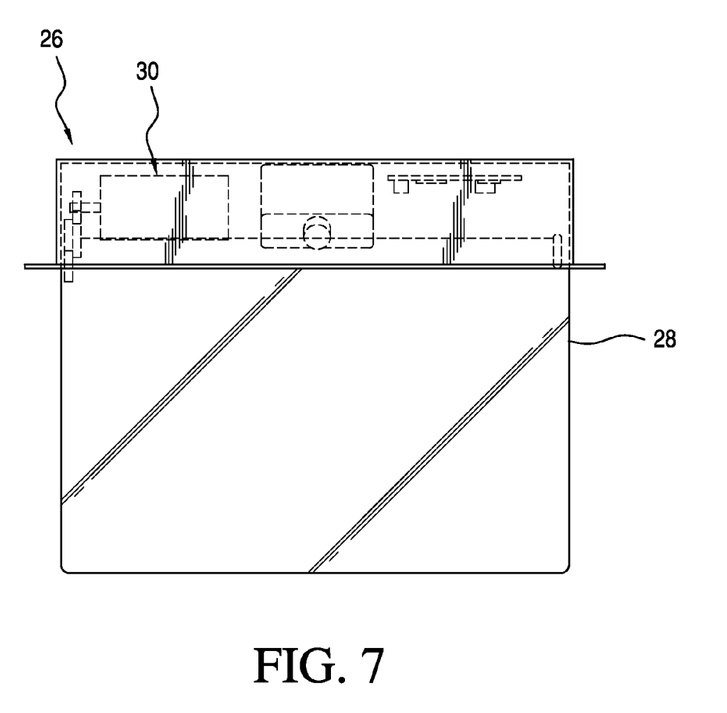
FIG. 7 is a front elevation of the third embodiment.

Referring now to FIGS. 6 and 7, in an alternative embodiment, designated generally as 26, the screen 28 is actuated by a motor assembly 30. The motor assembly 30 is typically made up of four components, a motor, a gear clutch mechanism, screen positional sensors and motor control circuitry. The motor is typically a rotational direct current or linear electric motor for movement of the screen between stored to deployed positions. Typically a gear and clutch mechanism mechanically couples the motor and the screen to allow the motor to drive the screen between the stored and deployed positions. Screen positional sensors are generally used by the motor control circuitry to determine when the screen is fully deployed or in the stored position. The motor control circuitry provides power and control to the motor and receives inputs from the screen positional sensors. In an alternative embodiment the screen may manually deployed instead of automatically deployed.

Figure 8:
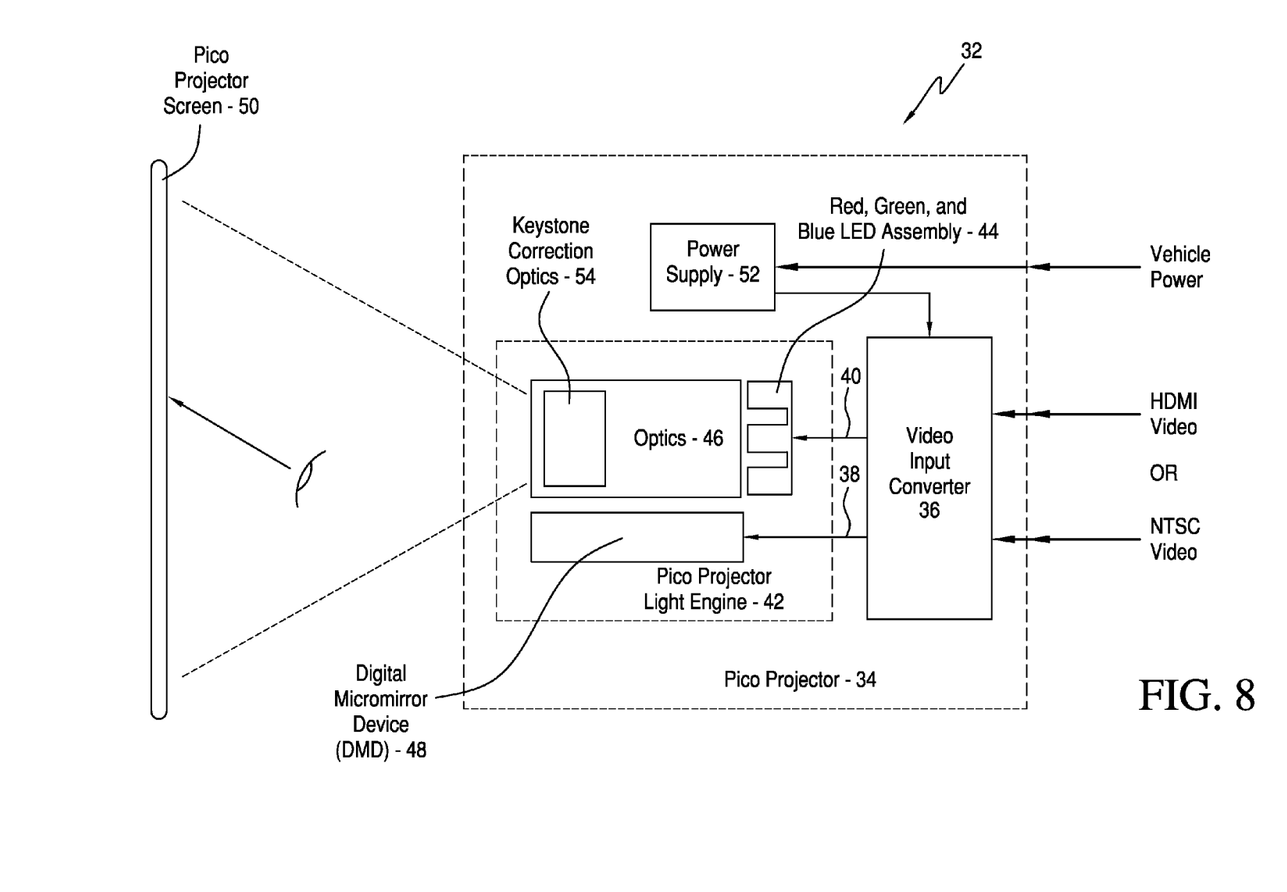
FIG. 8 is a schematic illustration of the front projection display system, implemented with keystone correction optics.

Referring now to FIG. 8, a schematic illustration of a front projection display system of the present invention is illustrated, designated generally as 32, which involves the utilization of keystone correction optics. The pico projector 34 includes a video input converter 36 for receiving a video signal and providing a Red Green and Blue (RGB) LED control signal 38 and a digital micromirror device (DMD) control signal 40. The RGB LED control signal 38 and DMD control signal 40 are synchronized, so that the DMD orients the micromirrors with the Red, Green, and Blue images. The video signal may be, for example, HDMI video or NTSC video.

A pico projector light engine 42 is operatively connected to the video input converter 36. The pico projector light engine 42 includes an RGB LED assembly 44 for receiving the LED control signal 40 and generating an LED output. An optics assembly 46 receives the LED output. The optics assembly 46 channels the LED output. A DMD 48 receives the DMD control signal 40 and the channeled LED output and providing an image to the optics assembly 46 for projection onto the pico front projector screen 50. A power supply 52 is operatively connected to the video input converter and converts the input power to the needed power levels needed within the pico projector. The pico projector 34 may typically have a brightness in a range of between about 10 and 100 lumens. For aircraft applications it would generally be about 50 lumens.

The optics assembly 46 includes keystone correction optics 54 for providing the keystone correction. The keystone correction optics 54 includes a lens shifting system that optically compensates projector screen 50 positioning offset from a position perpendicular to the light being emitted from the pico projector 34. The lens shifting system involves physical rotation of the lens.

Figure 9:
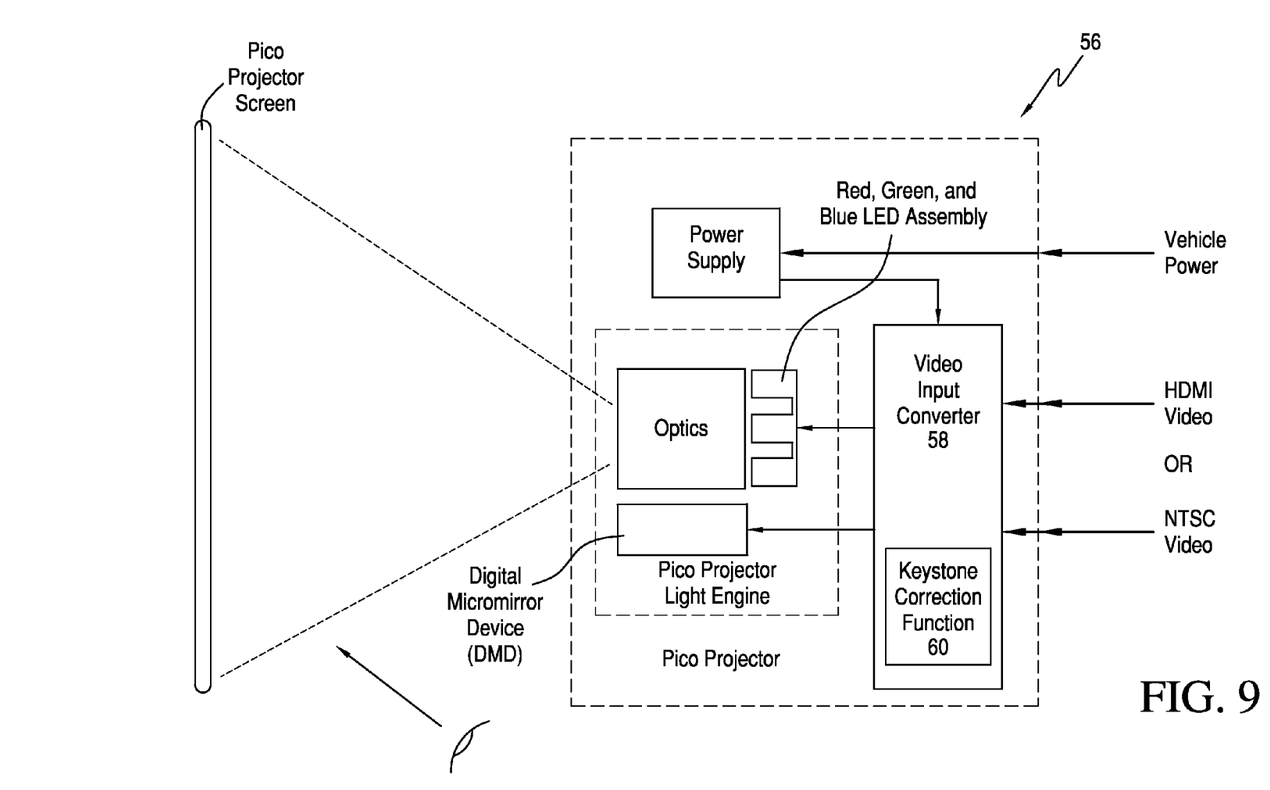
FIG. 9 is a schematic illustration of the front projection display system, implemented with digital keystone correction.

Referring now to FIG. 9, a schematic illustration of a front projection display system of the present invention is illustrated, designated generally as 56, which involves the utilization of digital keystone correction. In this system the video input converter 58 includes means 60 for providing digital keystone correction for predistorting the image to be projected when the projector screen is utilized that is not perpendicular to the light being emitted from the pico projector. Pre-distorting takes the original image and applies the opposite keystone affect to the image to be displayed.

Figure 10:
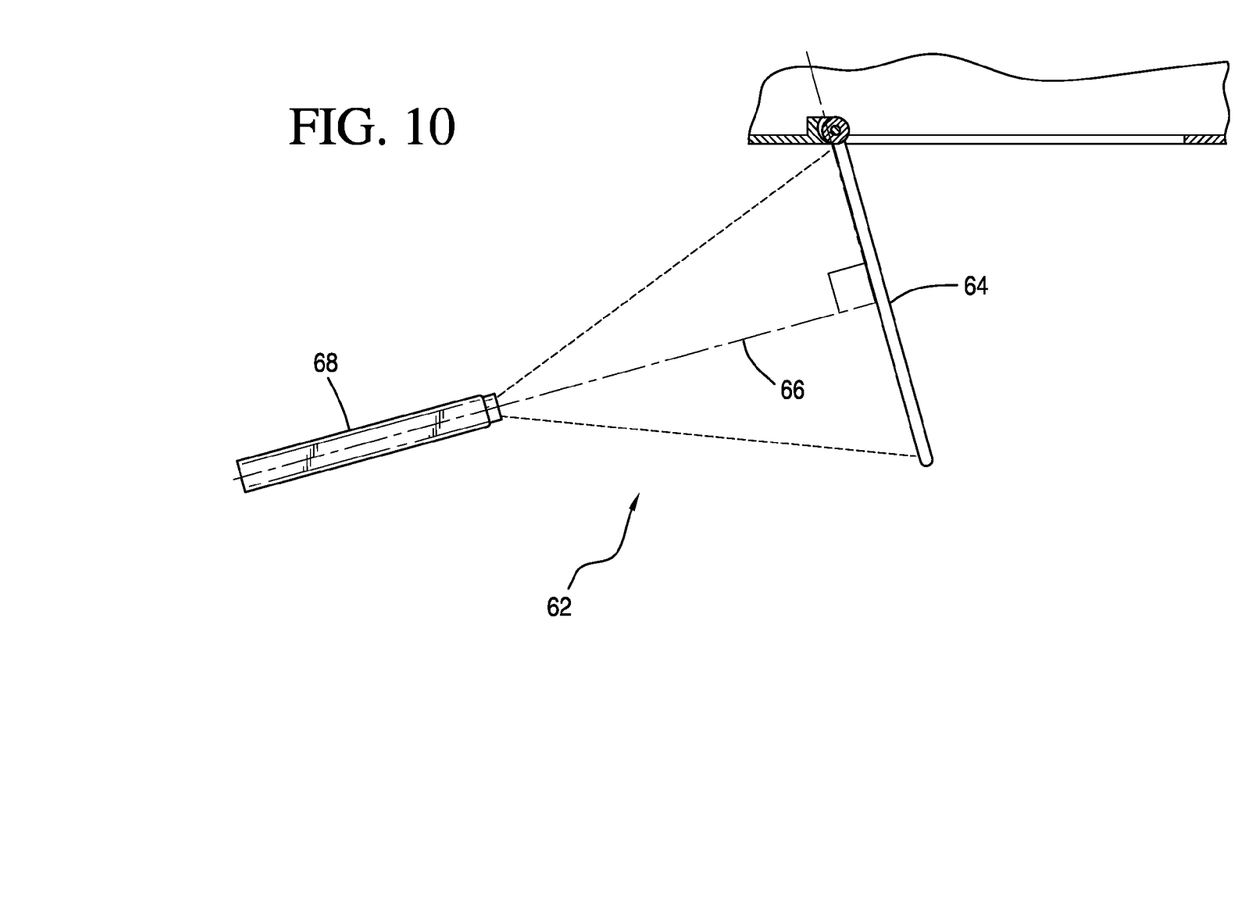
FIG. 10 is a side elevation of another embodiment in which the front projector screen is positioned so as to obviate the need for keystone correction.
Figure 11:
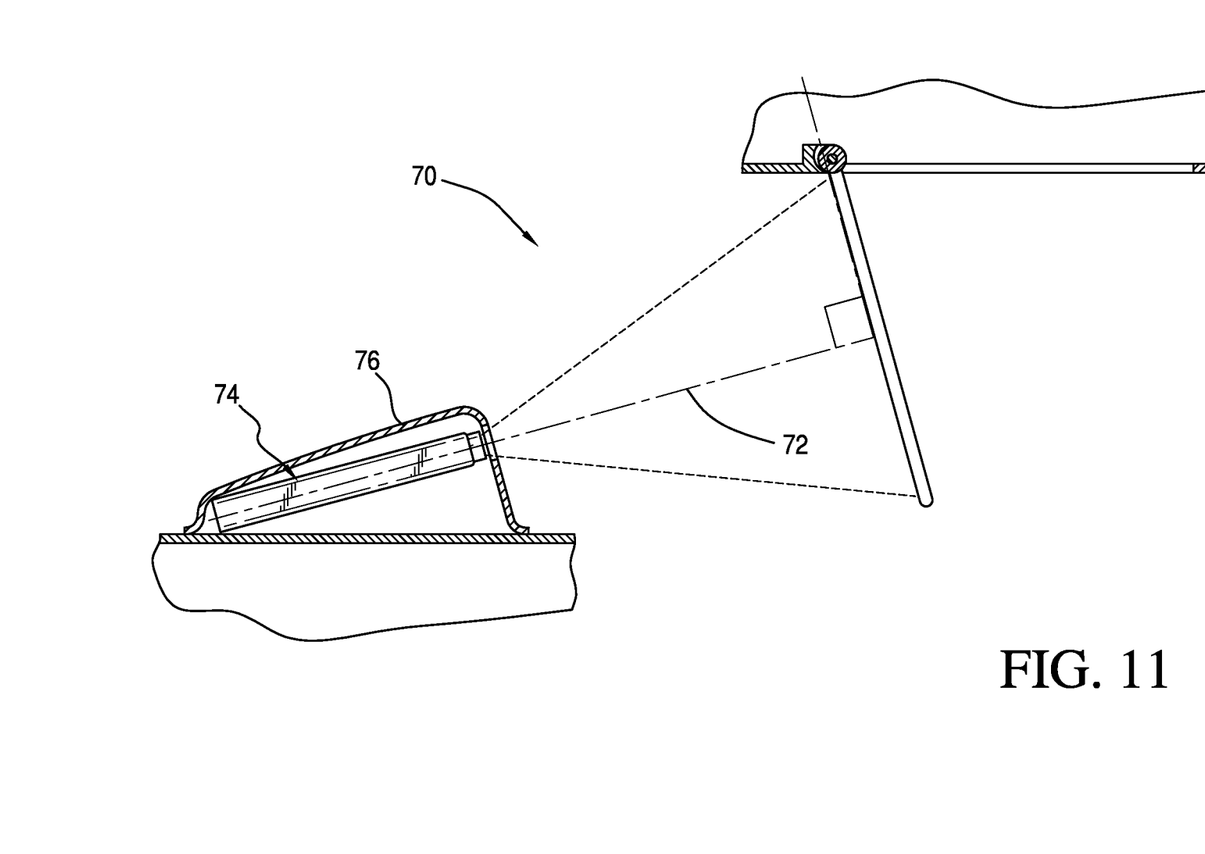
FIG. 11 is a side elevation of another embodiment in which the need for keystone correction is obviated, but in an instance where the pico projector is mounted within a protective covering.

Referring now to FIG. 10, a schematic illustration of a front projection display system of the present invention, designated generally as 62, in which the front projector screen 64 is positioned substantially perpendicular to the light 66 being emitted from the pico projector 68 so as to obviate the need for keystone correction. FIG. 11 shows a system, designated generally as 70, which utilizes this perpendicular light projection 72 relative to a pico projector 74 mounted within a dimple 76.

Other embodiments and configurations may be devised without departing from the spirit of the invention and the scope of the appended claims. For example, although the projection screen has been described as rotating in one plane it may articulate into position in several ways. It may rotate or translate (i.e. in and out linearly).

The invention claimed is:

1. A front projection display system for a vehicle, comprising:
   a) a pico projector securely mounted in a stationary position within a vehicle cabin, said pico projector including keystone correction; and,
   b) a rigid retractable pico front projector screen operatively connected to said pico projector wherein said rigid retractable pico front projector screen is rotatable up into an aircraft overhead bag bin of the vehicle cabin,
   wherein said pico projector comprises one of: i) a pico projector light engine including an optics assembly having keystone correction optics for providing said keystone correction;
   or ii) digital keystone correction; and,
   wherein said pico projector has a volume in a range of between 2.9 cubic inches and 63 cubic inches,
   wherein said pico projector and said front projector screen are positioned within an aircraft, and
   wherein said pico projector comprises:
      i) a video input converter for receiving a video signal and providing an LED control signal and a digital micromirror device (DMD) control signal, said LED control signal and DMD control signal being synchronized;
      ii) said a pico projector light engine is operatively connected to said video input converter, said a pico projector light engine comprises:
         an LED assembly for receiving said LED control signal and generating an LED output;
         an optics assembly for receiving said LED output, said optics assembly for channeling said LED output, said optics assembly including said keystone correction optics for providing said keystone correction; and
         a DMD for receiving said DMD control signal and said channeled LED output and providing an image to the optics assembly for projection onto said pico front projector screen; and,
      iii) a power supply operatively connected to said video input converter.

2. The front projection display system of claim 1, wherein said front projector screen comprises a portion of the surface of an overhead cabinet of an aircraft cabin.

3. The front projection display system of claim 1, wherein said pico projector is mounted within a protective covering within an aircraft cabin.

4. The front projection display system of claim 1, wherein said pico projector has a weight in a range of between about 8 oz and 16 oz.

5. The front projection display system of claim 1, wherein said pico projector has a power consumption in a range of between about 5 watts and 20 watts.

6. The front projection display system of claim 1, wherein said pico projector has a brightness in a range of between about 10 and 100 lumens.

7. The front projection display system of claim 1, further comprising a common housing for containing said pico projector and said retractable pico front projector screen.

8. The front projection display system of claim 1, further comprising a projector housing containing said pico projector and a screen housing containing said retractable pico front projector screen.

9. The front projection display system of claim 1, wherein said front projector screen is formed of vinyl fabric.

10. The front projection display system of claim 1, wherein said pico projector and said front projector screen are operatively connected via a motor assembly.

11. The front projection display system of claim 1, wherein said pico projector and said front projector screen are operatively connected via a spring loaded retraction assembly.

12. A front projection display system for a vehicle, comprising:
   a) a pico projector securely mounted in a stationary position within a vehicle cabin, said pico projector including keystone correction; and
   b) a rigid retractable pico front projector screen operatively connected to said pico projector wherein said rigid retractable pico front projector screen is rotatable up into an aircraft overhead bag big of the vehicle cabin,
   wherein said pico projector comprises one of: i) a pico projector light engine including an optics assembly having keystone correction optics for providing said keystone correction; or ii) digital keystone correction; and,
   wherein said pico projector has a volume in a range of between 2.9 cubic inches and 63 cubic inches,
   wherein said pico projector and said front projector screen are positioned within an aircraft.

* * * * *